R. R. LANGLEY.
PLANTER.
APPLICATION FILED NOV. 13, 1907.
928,203.
Patented July 13, 1909.
4 SHEETS—SHEET 1.
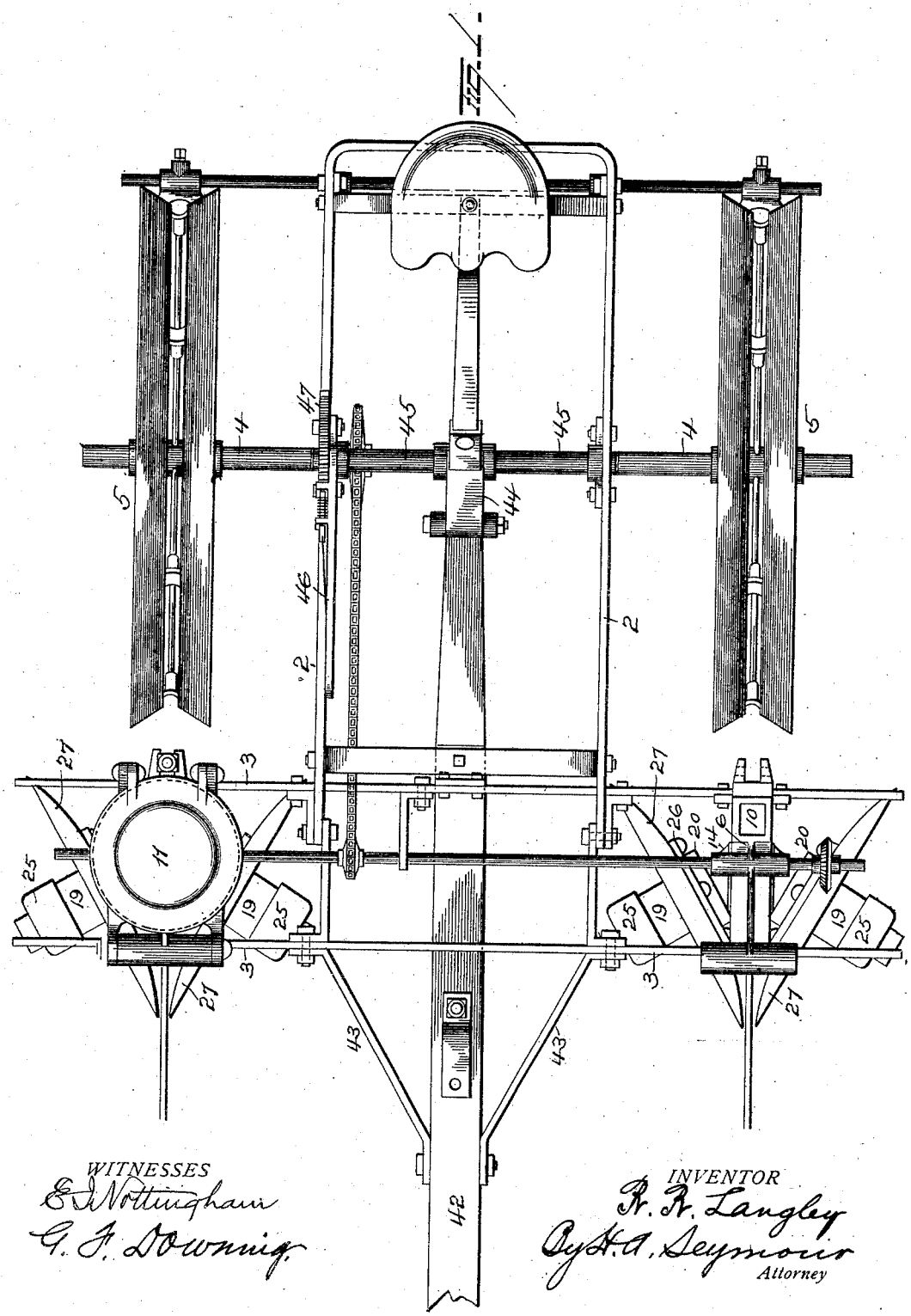
WITNESSES
E. S. Nottingham
G. F. Downing
INVENTOR
R. R. Langley
By H. A. Seymour
Attorney

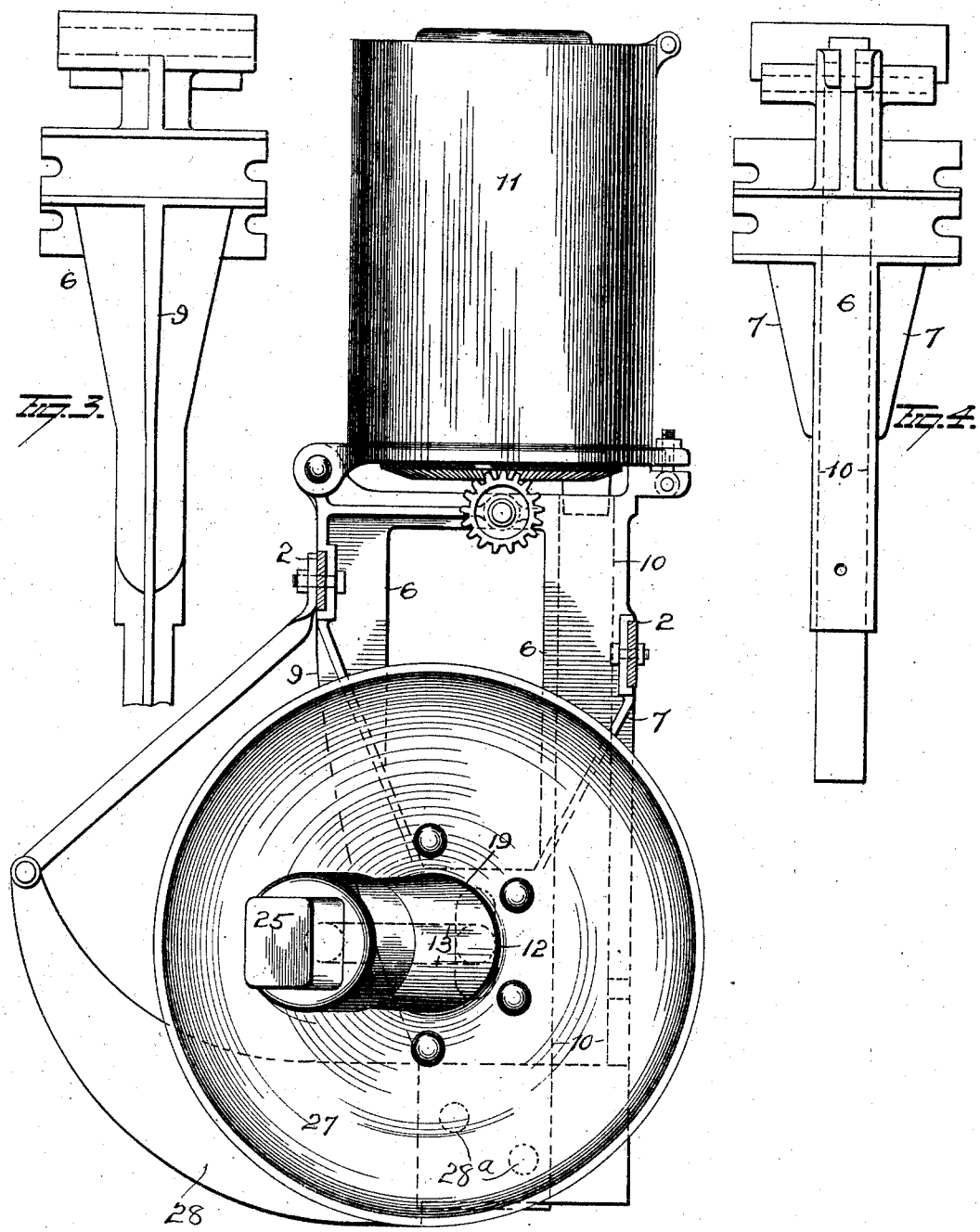

R. R. LANGLEY.
PLANTER.
APPLICATION FILED NOV. 13, 1907.
928,203.
Patented July 13, 1909.
4 SHEETS—SHEET 3.
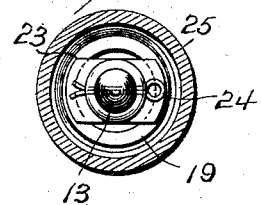
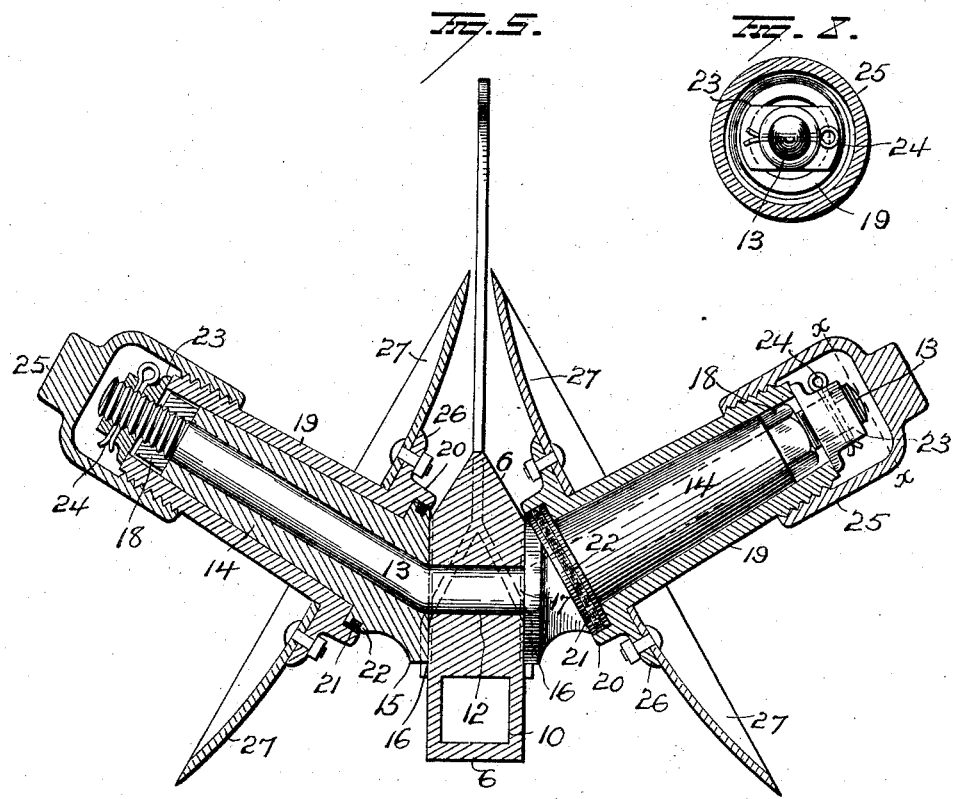
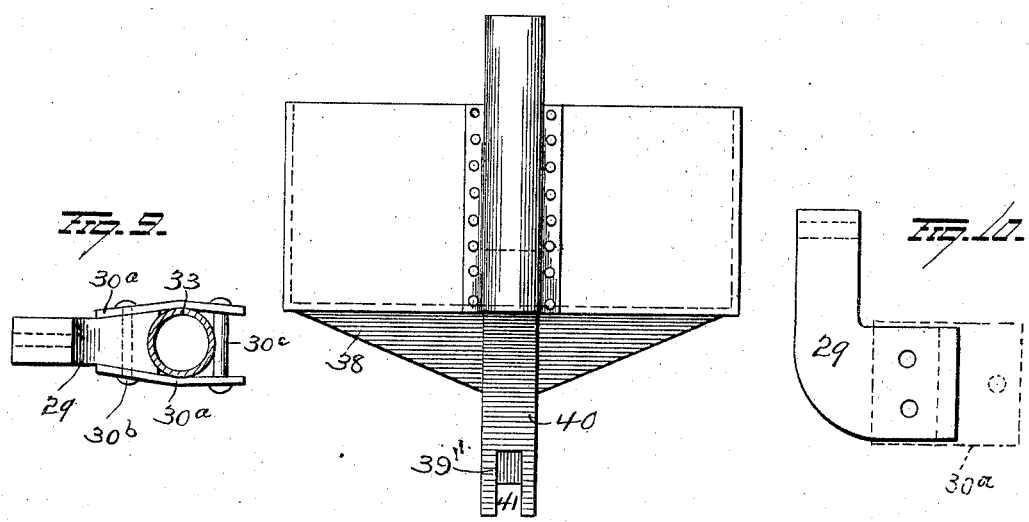
WITNESSES
INVENTOR
R. R. Langley
By H. A. Seymour
Attorney

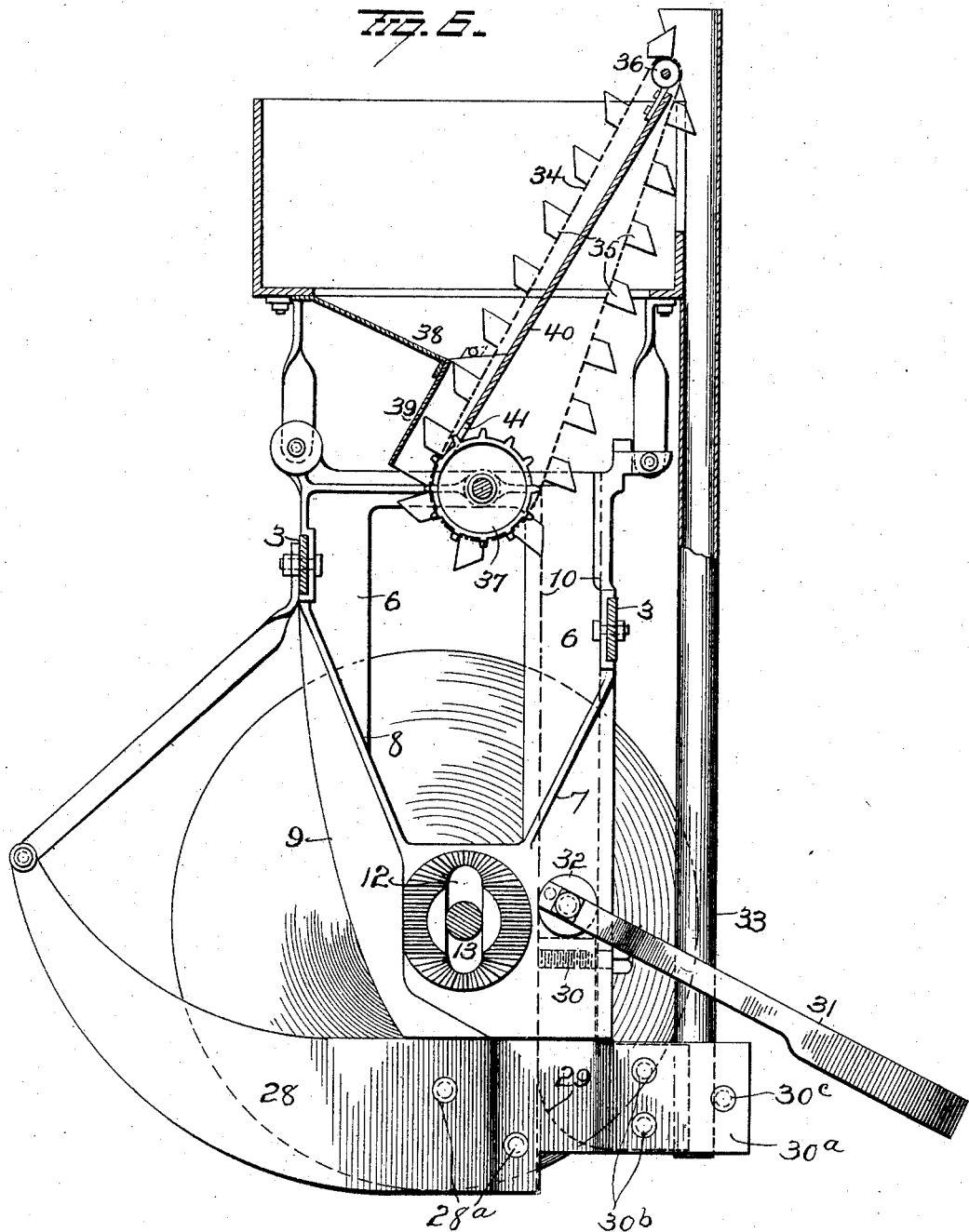

UNITED STATES PATENT OFFICE.

RALPH R. LANGLEY, OF LINCOLN, NEBRASKA.

PLANTER.

No. 928,203.      Specification of Letters Patent.      Patented July 13, 1909.

Original application filed July 8, 1907, Serial No. 382,653. Divided and this application filed November 13, 1907.
Serial No. 402,037.

*To all whom it may concern:*

Be it known that I, RALPH R. LANGLEY, of Lincoln, in the county of Lancaster and State of Nebraska, have invented certain new and useful Improvements in Planters; and I do hereby declare the following to be a full, clear, and exact description of the invention, such as will enable others skilled in the art to which it appertains to make and use the same.

My invention relates to improvements in planters and more particularly to an improved loose ground lister for potatoes and corn,—this application being a division of application for patent filed July 8th, 1907 and designated by Serial No. 382,653.

An object of my present invention is to provide a construction wherein the runners and covering knives, as well as the furrow-opening disks, can be carried by the shoe frames.

A further object is to provide simple and efficient feeding mechanism.

With these objects in view the invention consists in certain novel features of construction and combinations of parts as hereinafter set forth and pointed out in the claims.

In the accompanying drawings, Figure 1 is a plan view of a lister embodying my improvements. Fig. 2 is a side elevation, partly in section of the forward portion of the machine, when adapted for planting corn, Figs. 3 and 4 are front and rear views respectively, of the shoe frame. Fig. 5 is a view in horizontal section showing the mountings for the disks. Fig. 6 is an elevation partly in section illustrating the machine adapted for planting potatoes. Fig. 7 is a rear view of the seed box when the machine is used for planting potatoes. Fig. 8 is a sectional view on the line $x$—$x$ of Fig. 5. Fig. 9 is a plan view of the device for securing the potato feed boot 33 in place, and Fig. 10 is a detail view of the casting 29.

1 represents the framework of the machine, comprising a rectangular longitudinal frame 2 and a front transverse frame 3. An axle 4 is revolubly mounted rearwardly of the center of the frame 2 and has broad faced carrying wheels 5 secured to its respective ends.

Between the members of the transverse frame 3 at points in front of the carrying wheels 5, shoe frames 6 are secured. Each shoe frame comprises an open frame strengthened by ribs 7, 8 and 9, and the rear vertical member of this shoe frame is made tubular to form a duct or passage-way 10 (preferably angular in cross section) which communicates at its upper end with a seed box 11 mounted upon the shoe and serves to conduct the seed to the furrow. When corn is to be planted any suitable feeding mechanism may be employed for discharging the grains from the seed-box to the duct or passage-way 10 of the shoe frame 6, and an ordinary cornplanter shoe or runner is secured to the lower end of the shoe frame 6.

Each shoe-frame 6 is provided in its lower portion with a vertical, elongated slot 12 through which an axle 13 for carrying furrow-opening disks, passes. This axle is made arch-shaped and so disposed that it will project forwardly at each side of the shoe-frame 6, while its intermediate portion can be turned or moved vertically in the elongated slot 12 for the purpose of effecting adjustments as presently explained. On each forwardly projecting member of the axle 13 an axle-box 14 is located and provided with enlarged inner ends 15. The enlarged inner end 15 of each axle-box is made with a beveled face 16, grooved as at 17 to coöperate with the radial ribs arranged around the elongated-slot 12 in the shoe-frame 6. Nuts 18 are screwed on the forwardly projecting members of the axle and bear against the outer ends of the boxes 14, forcing the latter into locked engagement with the shoe-frame 6. Hubs 19 are mounted to rotate on the axle-boxes 14 and are provided at their inner ends with integral collars 20 which overlap the enlarged portions 15 of said axle-boxes, and between these collars and the portions 15 of the axle-boxes, suitable packing 21 is disposed and held in place in grooves 22 in said portions 15. The hubs 19 are held on by caps 23 slipped over the ends of the axle-members and bearing against the outer ends of the hubs. These caps are prevented from displacement by means of keys 24. A dust proof hard oil cap 25 is screwed on the outer end of each hub and incloses the outer end of the axle and the cap 23. Each hub 19 is provided at its inner end with an annular flange 26 to which a furrow-opening disk 27 is securely bolted.

With the construction and arrangement of parts above described, it will be seen that when the nuts 18, at the ends of the axle-members, are loosened, the axle-box can be disengaged from its locked connection with the shoe-frame 6 and the axle raised or lowered in the slot 12 for the purpose of raising or lowering the furrow-opening disk and thus regulating the depth of covering the seed. It will be apparent that when the parts shall have been thus loosened, the axle 12 can be partially rotated so as to alter the angle of its forwardly projecting member to the ground and thus cause the furrow-opening disks to become disposed a greater or less distance apart, at the bottom, thereby regulating the width of the furrow to be cut by said disks and amount of dirt left in bottom of furrow.

When the machine is to be used for potatoes, an annular casting 29 is inserted into the lower end of the corn chute or passageway 10 and held in place by means of a screw 30. Plates 30$^a$ are secured by means of rivets 30$^b$ to the rearwardly projecting portion of the casting 29 and project rearwardly therefrom, said plates constituting extensions of the heel portion of the runner 28, and the latter is secured to the depending frame 6 by means of rivets 28$^a$. A boot 33 is located behind the frame 6 and is adapted at its upper end to receive seed potatoes from a conveyer 34, and at its lower end, said boot passes between the plates 30$^a$ and is held in place by means of one or more bolts 30$^c$. Covering knives 31 for potatoes are also secured to the lower portion of the frame 6 and adjustment of these knives can be effected through the medium of clamps 32. The conveyer 34 comprises a chain with buckets or cups 35 (preferably angular in form). Each conveyer 34 passes over an idler wheel 36 on a shaft disposed over the seed-box and also around a sprocket wheel 37 on a shaft geared to the axle 4 from which it receives motion. Each seed-box is provided with a hopper-bottom 38 terminating at its lower end in a depending narrow extension 39 open at its bottom. The rear wall of the hopper bottom 38 and its extension 39 includes a guide-bar 40 disposed in an inclined position, terminating at its upper end near the idler wheel 36 and provided at its lower end with a slot 41 for the accommodation of the sprocket-wheel 37. The buckets or cups 35 of the conveyer are spaced apart in such manner that there will always be one of said buckets or cups within the narrow extension 39 of the hopper bottom and prevent the escape of potatoes from the open lower end of said extension 29. From this construction and arrangement of parts it will be seen that as the machine moves forward the disks will cut furrows for the reception of potatoes and motion will be transmitted to the conveyer 34 and cause the latter to feed potatoes from the seed-box into the boots 33, by which latter they will be deposited into the furrow—the knives 31 serving to cover them and the carrying wheels serving to press the dirt down on the seed causing quick germination.

A tongue 42 is attached between its ends to the forward portion of the frame-work and connected with the transverse frame 3 by means of brace-rods 43. This tongue projects rearwardly to a point slightly in advance of the axle 4 where it is pivotally connected with an arm 44 projecting from a shaft 45 mounted in the frame 2. An operating lever 46 is pivoted to a toothed-segment 47 secured to the frame 2 and provided with a suitable pawl to engage the toothed-segment. The lever 46 is secured to the shaft 45 and provides means for turning the latter to raise the tongue and thus elevate the furrow-opening disks and remove them from the ground, or force them in the ground and regulate the depth of furrow.

A suitable seat for the operator is mounted on the rear end of frame 2.

Numerous slight changes might be made in the details of construction of my invention without departing from the spirit thereof or limiting its scope and hence I do not wish to restrict myself to the precise form and construction of the various details herein set forth.

Having fully described my invention what I claim as new and desire to secure by Letters Patent, is:—

1. In a planter, the combination with a main frame and a depending frame provided with a corn chute, of furrow-opening disks carried by the depending frame, and an attachment comprising a potato feed removably secured over the depending frame and a potato tube removably attached to the lower portion of said depending frame.

2. In a planter, the combination with a main frame and a depending frame provided with a corn chute, of furrow-opening disks and a runner carried by the depending frame, and an attachment comprising a potato feed removably secured over the depending frame and a potato tube removably attached to the lower portion of said depending frame.

3. In a planter, the combination of a frame having a tubular portion adapted to be used as a seed chute, a boot, a casting attached to the lower portion of said boot and having an upright portion to enter the lower end of the tubular portion of said frame, means for securing said casting in place and a runner in advance of said casting, the upper portion of said frame being adapted for the reception of interchangeable feeding means.

4. In a planting machine, the combination with a main frame, a depending frame having a tubular portion adapted to be used as a seed tube, and furrow opening disks carried by the depending frame, of a seed box removably secured over the depending frame, a boot behind the depending frame, a conveyer to take seed from the seed box and deposit the same in the boot behind the depending frame, and means for removably securing the boot to the depending frame behind the tubular portion thereof.

In testimony whereof, I have signed this specification in the presence of two subscibing witnesses.

RALPH R. LANGLEY.

Witnesses:
J. W. BREWSTER,
A. F. MOORE.